Sept. 3, 1963 V. J. MOONEY 3,103,008
AUTOMATIC MAP MATCHING SYSTEM AND APPARATUS
Filed Jan. 8, 1959 5 Sheets-Sheet 5

INVENTOR.
VICENT J. MOONEY
BY Moses, Nolte + Nolte
attorneys for applicant

United States Patent Office 3,103,008
Patented Sept. 3, 1963

3,103,008
AUTOMATIC MAP MATCHING SYSTEM
AND APPARATUS
Vincent J. Mooney, Floral Park, N.Y., assignor to Maxson Electronics Corporation, a corporation of New York
Filed Jan. 8, 1959, Ser. No. 785,678
4 Claims. (Cl. 343—5)

The present invention relates to a method and system for automatically matching a radar map (or other "live data" map) with a stored data, or reference, map.

Such map matching is performed in navigation systems and most typically in air navigation. In automatic navigating systems, use is made of known terrain features by providing a map of these against which reference is made. Examination of the actual terrain is made by using known methods such as radar or infra-red scanners, which replace the human observer.

We are concerned here with performing the comparison which must be made between the known characteristics of the terrain and those which we fined by the scanning process. The former are usually stored in the form of a photographic transparency while the latter may be presented on the face of a cathode ray tube or on a photographic transparency.

A common method is to have one a negative and one a positive (in the usual sense of photographic negative and positive). A comparison of these copies is made by overlaying the two, passing light through them, and detecting the relative position which gives minimum total light transmission. The fact that the total light transmission is reduced at a certain relative position is taken to indicate a "match" of the maps.

This invention provides a comparison method which gives a more accurate match overall, and also allows smaller selected areas to be used if desired, than the method of total light transmission, which method may give ambiguous information since the total light transmission is not always sensitive to mismatch and indeed may show minimums for several positions of misalignment between the positive and the negative transparencies.

The method of this invention does not depend on overall light transmission but studies the transmission of light from a small area spot scanned over the whole area. This scanning is performed as the live positive image and negative reference picture are translated one with respect to the other to several positions.

"Small area spot" means that in pictures with dimensions of the order of 10 cm. diameter, an area of the order of 0.1 mm. sq. would be sequentially scanned with the spot of light.

To see the result of comparisons made by the above method, assume that we have a positive and a negative which do correspond and that we place them on each other in register. The light transmission through the two would be uniform and the scanning process would give no output except an arbitrary and constant D.C., if live and reference picture are ideally mated.

If we slide the two out of register, we get a light transmission effect, sharply different from the previous "flatness," and known as the "cameo" effect. Scanning will then give an output in which the alternations in light transmission will be rich in frequencies well removed from zero frequency, the exact value of which will be dependent, of course, on the rate of scanning and the size of the scanning spot.

To consider the practical case, it should be realized that the best live picture (positive) when overlaid on the reference negative and placed in register will not give uniform, constant light transmission.

There will be overall transmission which is high, low, or medium, depending on densities of positive and negative; there will be areas of all sizes where light transmission will be above or below "average" over the whole photograph. The scanning process will then show for an output a spectrum of frequencies which will tend toward a white spectrum including all frequencies, at least up to a limiting frequency.

If we de-register the positive and the negative slightly, striving for the cameo effect, there will be a sharp increase in higher frequencies of the scanning output spectrum.

The invention will be fully understood from the following description and the accompanying drawings, in which.

Figure 1:
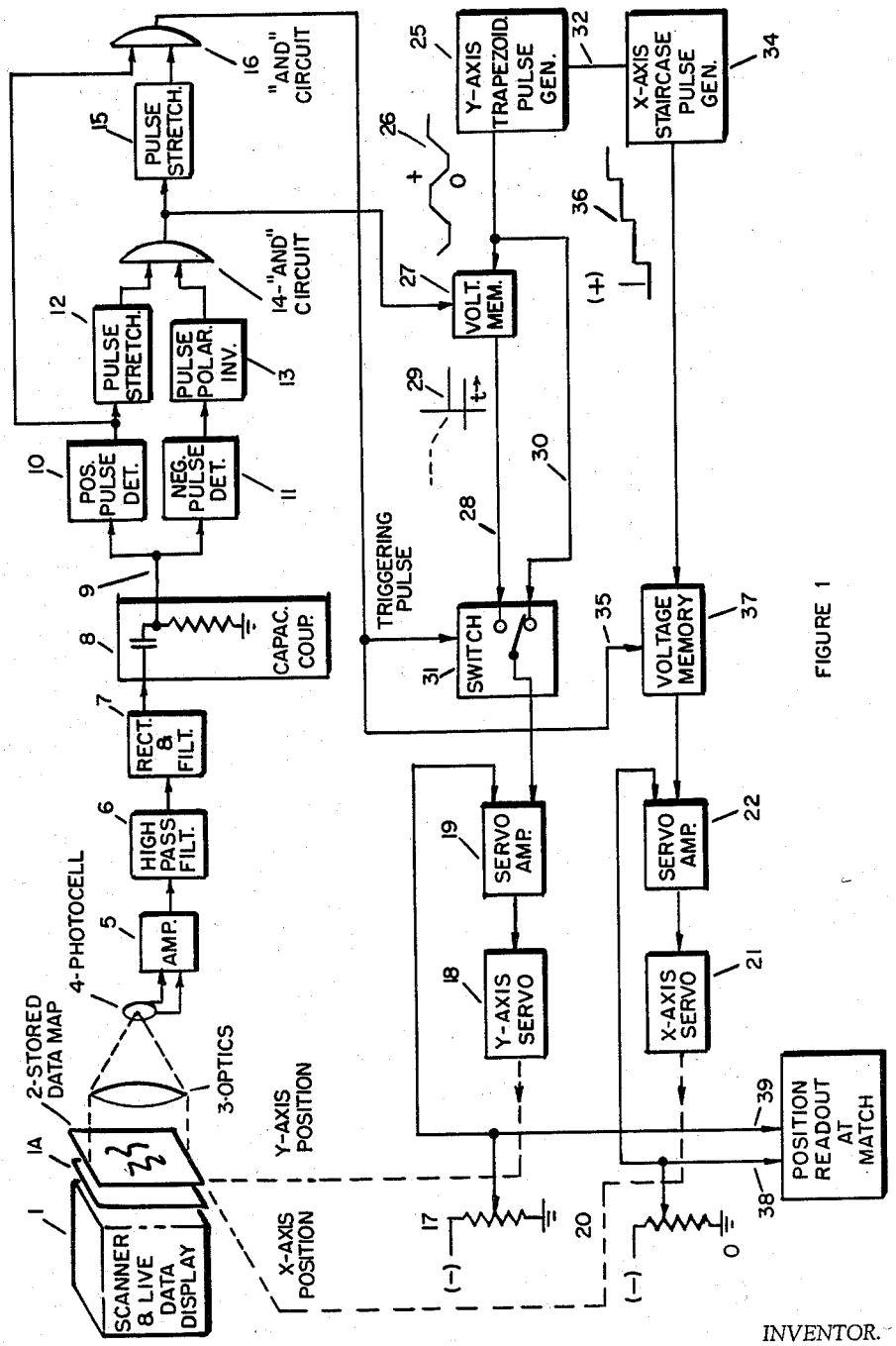
FIG. 1 is a block diagram of a map matching system according to the invention.

Referring to FIG. 1, item 1 is a live data display which may be a radar indicator oscilloscope presenting a radar or infra red map, or, alternatively, 1 may be a light-spot scanning device such as a rotating or oscillating mirror or a cathode ray tube spot scanning a live data rapid-process photographic positive 1A. Linear motion of the light spot is preferable to sinusoidal motion. If a photographic positive is not used, the indicator should be a repeater display having the capability of scanning a line of data at a high rate.

Figure 5:
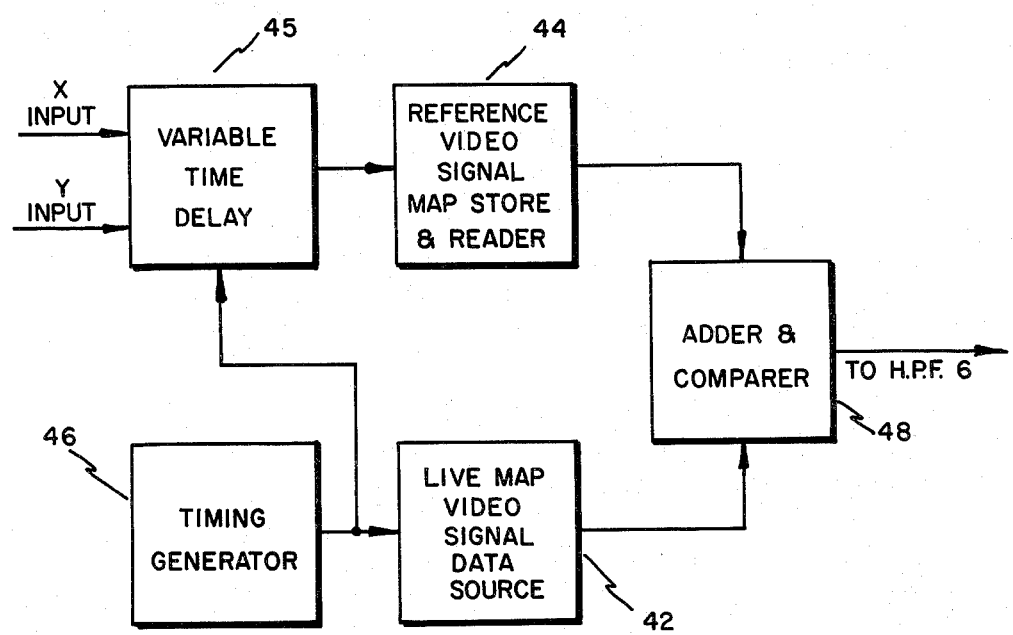
FIG. 5 is a block diagram of another matching system utilizing electrical map signals.

Item 2 is a stored data map in the form of a photographic negative which has been prepared before flight, while item 3 is a lens for gathering light into the photocell 4. 5 is a broadband amplifier for raising the photocell signal level to a higher power before it is applied to the high pass filter 6. The purpose of the high pass filter is to make the system sensitive to the cameo effect described above. Alternatively to the elements 1 through 5, we may use electrical signals representative of the map stored on magnetic tape or by other means and may make a comparison in electrical circuits of the reference video signal with the live data video signal, such as from a radar or infra-red device, without converting the data to photographic or cathode ray tube display form. In this case, reference and live data can both be either positive or negative since polarity change is easily made electrically. Also the electrical scale of map values can be very linear and extensive, as well as adjustable, corresponding to variation in picture contrast. When the difference is taken electrically it corresponds to scanning the maps with a light spot of virtually zero area, giving excellent resolution of detail. The time base of the electrical signal will be determined by the tape reading speed, corresponding to the light spot scanning speed. FIGURE 5 illustrates a method for replacing elements 1 through 5 of FIG. 1 by means of an alternate video reference medium such as tape. It consists of a variable time delay device 45, video reference storage and readout 44, a comparator or difference circuit 48, a live video source 42, and a timing generator 46. In operation, the timing generator would initiate a pulse to start a reference line of live video.

If the live video source 42 is a radar system, for example, the pulse will be synchronized with the first video return. This pulse will also initiate the start of the video readout from the video reference 44. The starting time and thus the phase of the reference video can be modulated by a variable time delay 45 in series with this timing pulse. The scanning phase of the reference video is controlled by the Y input signal in a similar manner to the positioning of the stored data map shown in FIGURE 1 except that each line of recorded information is scanned by a moving magnetic head.

Figure 2:
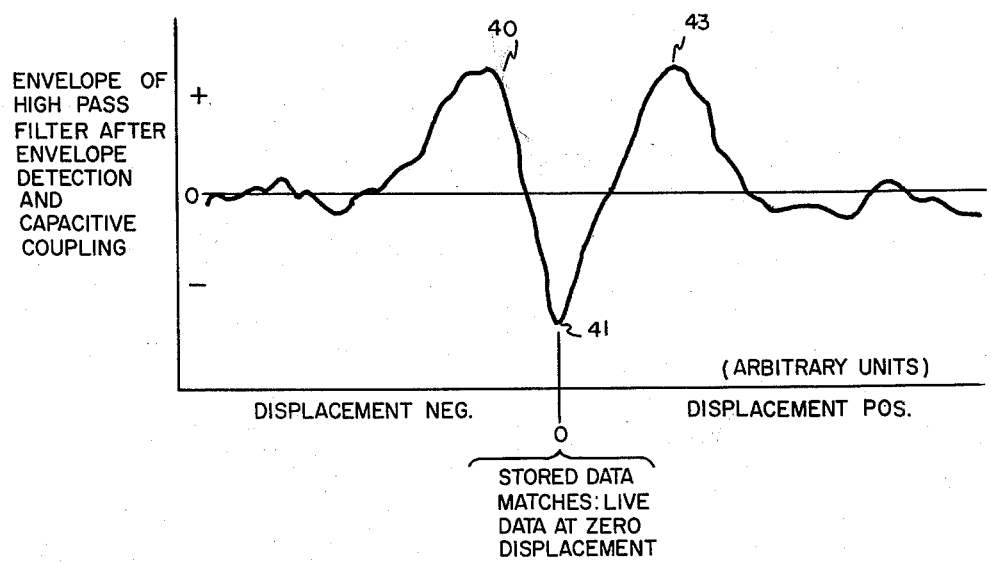
FIG. 2 is a graph of the output versus relative position of positive and negative.
Figure 3:
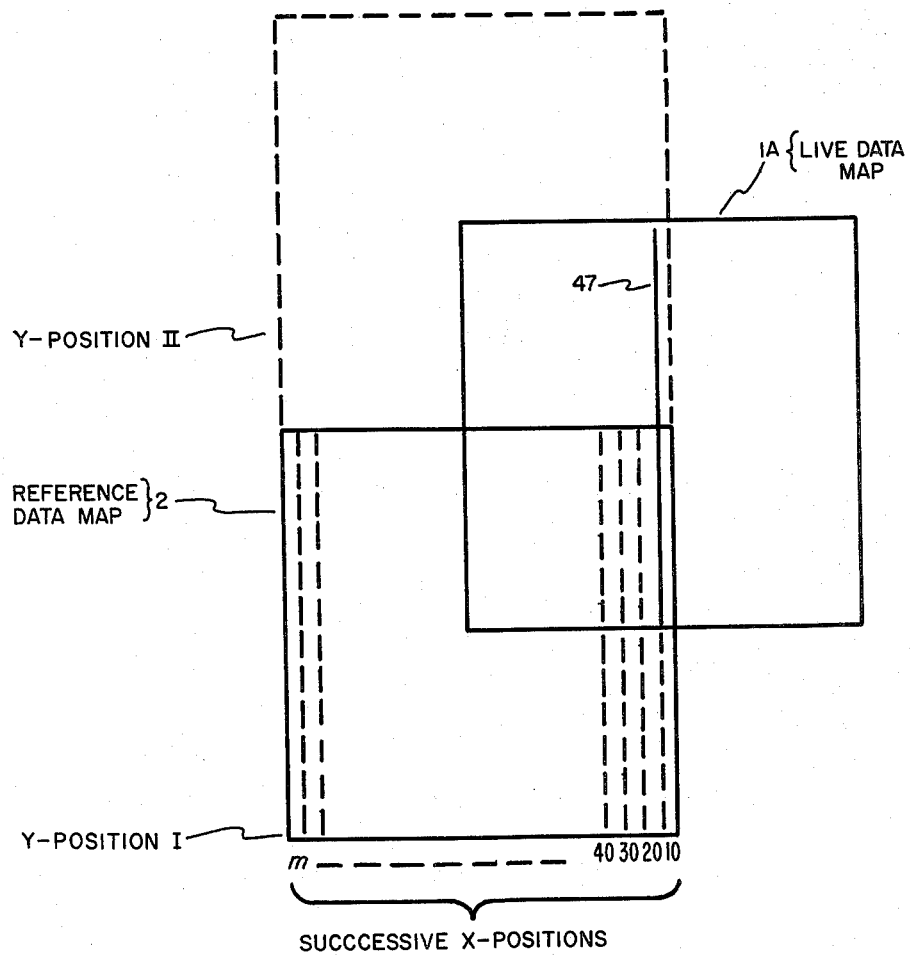
FIG. 3 is a diagram illustrating a map positioning and scanning procedure.

Each of these scans will constitute the scan of one line 10, 20, 30, 40 . . . m indicated in FIGURE 3. As the tape equivalent of line 10, for example, is scanned, and no negative peak as shown in FIGURE 2 appears at the output of the comparator 48, the X input will translate the tape mechanism a distance of one line and the head will then scan this line which will be equivalent to scanning line 20 in FIGURE 3. When a negative pulse appears indicating a match between the live video and the tape video the position of the tape can be read out in a manner similar to FIGURE 1.

Continuing with the description of FIG. 1, the output of the high-pass filter is rectified and filtered in a low pass filter 7 so that the envelope only of the high frequencies in the original signal is obtained. 8 shows the capacitive coupling used to make the envelope waveshape vary about zero as its average value. The waveform at output 9, that is, the voltage versus displacement, is shown in FIG. 2. This shows the increase of high frequencies due to cameo effect which causes the envelope to rise at peak 40 when the match is off slightly, to decrease sharply to the negative peak 41 at the point where positive and negative match with least error, and to rise again to peak 43 where the match is again off but in the opposite direction.

The process of searching automatically for the point of match is illustrated in FIG. 1 by the use of servos 18 and 21 which mechanically move the stored data map successively to a full range of different positions relative to the live data map until the detection of the cameo effect determines the match point.

FIG. 3 shows a form of scanning pattern which may be used. Reference data map 2 starts out in Y-position I and is moved vertically. The solid line 47 drawn down the middle of live data map 1A represents the path of the light spot scanning which takes place along this line. The dotted lines 10, 20, 30 40 . . . m on the reference data are lines along which the reference data will be scanned as a result of its vertical motion. For example, after moving up from Y-position I to Y-position II, line 10 will have been scanned and the reference data map will then be moved over in the X-axis direction to cause dotted line 20 to overlay solid line 47. Uniform motion downward will bring the reference data map back to Y-position I, displacement in the X-axis direction will cause line 30 to overlay line 47 and the scanning will continue in this manner until the whole of reference data map 2 has been scanned to locate the point of match. It should be noted that while the scanning line 47 has for illustration been specified as being in the middle of the live data map, there is no reason why it could not be located at any other desired position. Also, while we have illustrated the method of comparison with one line of scan, it may be advantageous to scan the whole picture while the overlay position is varied. The signal which controls the Y-axis servo 18 is generated by Y-axis trapezoidal pulse generator 25. The waveform 26 shows a uniform change in voltage between values of zero and a fixed positive level which is carried by conductor 30, through switch 31 as shown, to servo amplifier 19. The servo amplifier 19 causes Y-axis servo 18 to position itself so that the potentiometer 17 will return a voltage from its wiper to the input of servo amplifier 19 to balance waveform 26 to a null continuously. In this manner the servo output, which is the Y-axis position of the reference data map, is automatically moved from position I to position II while light spot scanning along a line is performed. Simultaneously with this Y-axis scanning, the X-axis staircase pulse generator 34, which is synchronized through connection 32 with 25, gives out the waveform 36 causing servo amplifier 22, servo 21, and potentiometer 20 to perform X-axis motions conforming to FIG. 3 as described above.

Scanning patterns which are circular, spiral, or made up of linear motions different from the particular pattern of FIG. 3 are also suitable for the purpose of detecting the match point by use of the cameo effect.

It should be noted that electrical comparison of live and reference data read from, say, magnetic tapes, as discussed above will not require the use of servos, but the equivalent operation will be to subtract live and reference voltages while translating one with respect to the other in a system which identifies the match point by the high frequencies generated by the cameo effect.

In order that the waveform of FIG. 2 can be detected when it occurs, the presence of the three peaks marked 40, 41, 43 must be determined. Referring to FIG. 1, this is performed as follows: Positive pulse detector 10 gives out a pulse when the first peak occurs and negative pulse detector 11 gives out a pulse when the second and negative peak occurs. The pulse stretcher 12 extends the duration of its input pulse so that the stretched pulse will overlap in time the pulse produced by the negative peak. The negative pulse detector 11 has its output inverted by the pulse polarity inverter 13. Pulse stretcher 12 and polarity inverter 13 feed AND circuit 14 which gives an output only if a pulse exists on each of its inputs. To determine that the second positive peak exists as well as the two earlier peaks, pulse stretcher 15 lengthens the output pulse of AND circuit 14 and feeds AND circuit 16. The other input of 16 is from positive pulse detector 10. AND circuit 16 will produce an output pulse when both inputs to it simultaneously feed in pulses. Note that the positive pulse detector output which is effective with AND circuit 16 is the second output pulse which it produces due to peak 43 of FIG. 2.

When the existence of the three peaks of FIG. 2 has been determined in the manner described, the coordinates of the reference map carriage position for match between reference and live data will be available. These coordinates are the values of X and Y when negative peak 41 of FIG. 2 occurs. The value of X for peak 41 is the same as for peak 43, since overlay motion is along straight vertical lines. Therefore, the output of AND circuit 16 is connected by line 35 to the voltage memory 37 which remembers the X-axis voltage value at the moment the coincidence pulse is fed out of AND circuit 16.

The Y-axis voltage may be found by pulsing voltage memory 27 with the output pulse of AND circuit 14; this will cause the output voltage of the voltage memory 27 to preserve the value of the trapezoidal waveform which exists at the instant of the pulse.

The waveform 29 existing on lead 28 is not applied to the servo amplifier 19 unless switch 31 is triggered by a pulse from AND circuit 16. A pulse from 16 indicates that the two maps do match; therefore the Y-coordinate value is then switched by this pulse into servo amplifier 19 and the servo nulls on this value. Both X and Y values for map match can now be read out as voltages from the wipers of potentiometers 20 and 17 on leads 38 and 39 as shown.

Alternatively X-axis voltage at match may be read out of voltage memory 37 and X-axis voltage at match may be read out of voltage memory 27.

In place of moving the reference map by means of Y-axis servo 18 and X-axis servo 21 an alternative method of making the overlay comparison is to display the positive map on a cathode ray tube, as mentioned above, and to displace the display electrically by means of voltage waveforms 26 and 36 applied to the deflection circuits of the cathode ray tube.

While in the usual case there will be only one overlay position where the waveform of FIG. 2 will occur, provision can be made for selecting the largest of such waveforms should several occur in one map due to special conditions. The method will first be described in general terms and then in specific detail with reference to FIG. 4.

To establish a quantitative measure of the waveform configuration of FIG. 2, pulses proportional in amplitude to each of peaks 40, 41 and 43 are produced. These are stretched, the negative pulse inverted to a positive pulse, and all are added to make a three-step pulse having an overall amplitude which is stored.

If another waveform shaped like FIG. 2 occurs, a second three step pulse is formed. This is stored if it exceeds the amplitude of the previous pulse, or rejected if it does not exceed this amplitude. If it does exceed the amplitude of the previous pulse its X and Y coordinates are left in a voltage memory until a larger pulse amplitude is encountered. When this larger pulse amplitude occurs, its coordinates will be stored and the earlier values erased.

Figure 4:
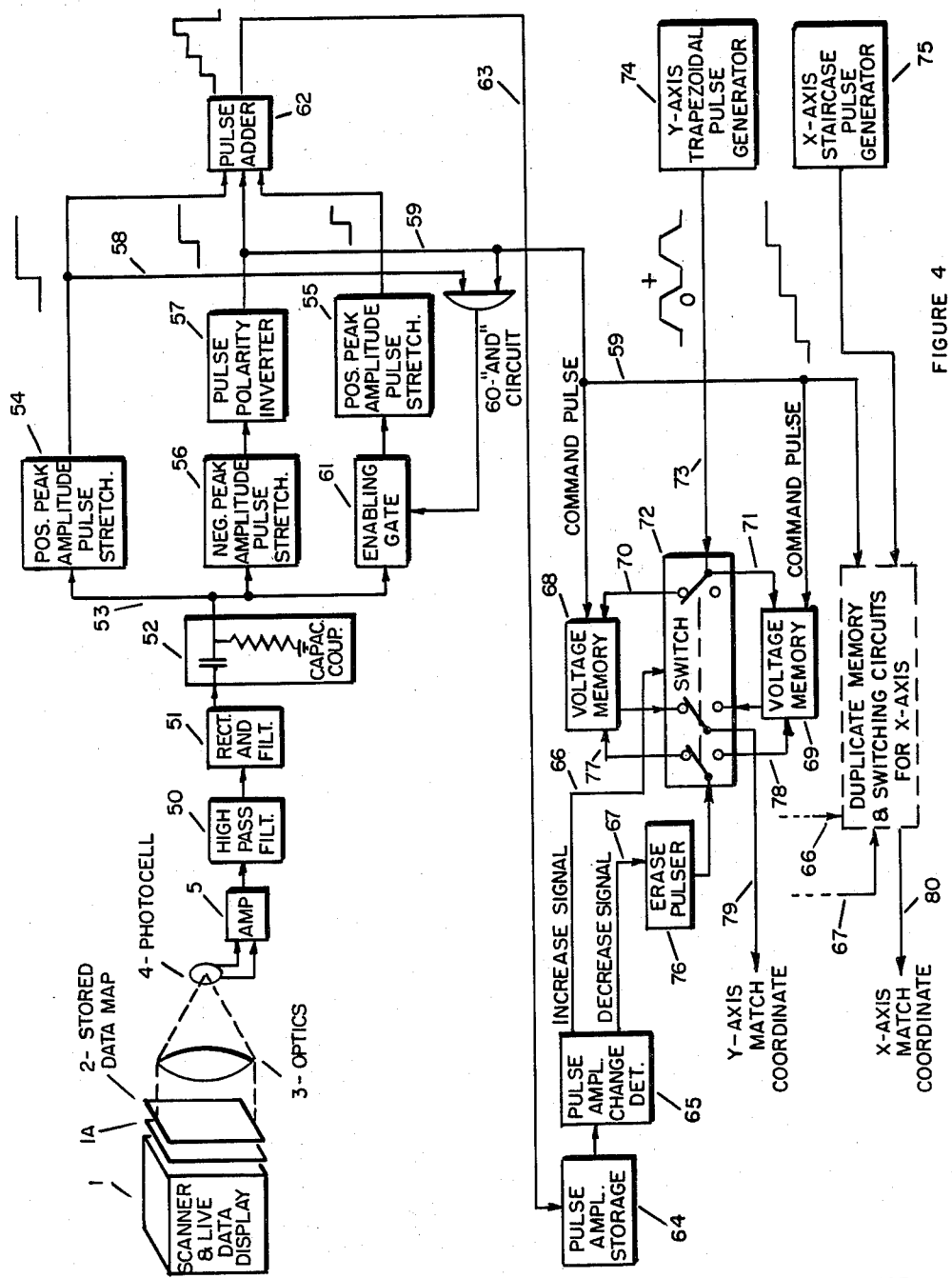
FIG. 4 is a block diagram of a map matching system for obtaining the best of a plurality of map matching positions.

In FIG. 4 the input to high pass filter 50 is from a scanning system similar to that previously discussed, namely the map handling elements 1 to 5 and map shifting elements 18 and 21, etc., of FIG. 1 or the magnetic map storing devices described above. The rectifier and low pass filter 51, and capacitive coupling 52 as already discussed give the envelope of high frequencies found as a result of scanning. The waveform on line 53 will be, therefore, as shown in FIG. 2 at times when we move the maps through the match position. We now make the assumption that local cameo effect may be present for several areas of the map, that such a waveform may occur several times, and that we want to distinguish the largest of these and determine its coordinates.

Positive peak amplitude pulse stretchers 54 and 55 produce pulses whose duration is of the order of the time interval between peaks 40 and 43 of FIG. 2 and whose amplitude preserves the amplitude of the original peaks themselves.

Negative peak amplitude pulse stretcher 56 has the same function except that it is operative only on negative voltage inputs. 56 is followed by pulse polarity inverter 57. The first positive peak and the negative peak will send positive stretched pulse inputs on leads 58 and 59 to AND circuit 60. The output of AND circuit 60 will pulse ON the enabling gate 61 in time for the second positive peak, if it exists, to pass through and enter positive pulse stretcher 55. All stretched pulses enter the pulse adder 62 which sends the sum of the three pulses on lead 63 to the pulse amplitude storage 64. This amplitude storage is an analogue device, typically a low-leakage capacitor charged through a switching circuit in a manner which removes the discharge path after the capacitor has been charged. The pulse amplitude increase detector 65 detects any change in voltage level of the storage device and gives out an "increase" signal in the form of a pulse on lead 66 and a "decrease" signal pulse on the lead 67.

The function of voltage level memories 68 and 69 is to store the Y-axis coordinate voltage which is the analogue of Y-axis displacement. Two memories are used so that after the coordinate voltage of the first pulse is stored, a second coordinate may be stored until it is determined that this second pulse is larger than the first and its coordinate should be retained. This selection is made as follows: Conductor 59 brings the pulse due to the negative peak to memories 68 and 69 where it acts as a command pulse causing whatever voltage exists on inputs 70 and 71 to be stored. When the search for a match between live data and reference data maps encounters the first waveform like FIG. 2 let us assume that switch 72 is making contact at the lower contacts, instead of as shown. When the command pulse on lead 59 reaches voltage memory 69 it will cause the memory to retain the voltage on lead 71 at that instant. In a very short interval later, equal approximately to the distance between peaks 41 and 43 on FIG. 2, pulse amplitude change detector 65 will put out a pulse on the "increase signal" lead 66 which will transfer switch contacts to the positions shown. Scanning will continue without interruption, and when the second waveform is encountered the coordinates of the negative peak will now be stored in voltage memory 68 for the Y-axis (and its counterpart for the X-axis) when the command pulse occurs. For a short interval of time memories 68 and 69 will have first pulse and second pulse coordinates stored. However, if the second pulse is smaller than the first, a "decrease signal" will energize the erase pulser 76 which, through connection 77 will erase memory 68 still leaving it connected for another storage entry. Alternatively, if the second pulse is larger than the first, an "increase signal" pulse will cause switch 72 to transfer contacts, leaving memory 68 retaining the coordinate voltage of the second pulse. The stored value of the Y coordinates of the largest pulse encountered during the whole search for a match will, by the means described, be available for read out on lead 79 and, by use of duplicates memory and switching circuits, will be available on lead 80 for the X axis.

While specific embodiments of the invention have been shown and described in detail to illustrate the application of the invention principles, it will be understood that the invention may be embodied otherwise without departing from such principles.

What is claimed is:

1. An automatic map matching system mounted in a vehicle for determining the location of the vehicle with respect to a selected area, said system comprising means for storing a map of said area, means for producing a radar map of said area, one of said maps being in the form of a light transmitting negative and the other being in the form of a light transmitting positive, means for superimposing and scanning the maps with a light spot which is moved linearly in one direction, means for moving said maps relative to each other in said one direction, means for moving the maps relative to each other by a discrete amount in the direction perpendicular to said one direction after each complete excursion in said one direction, means responsive to said light spot for producing electric potentials corresponding to the intensity of the light spot after it has passed through said maps, means for rectifying and filtering said potentials for obtaining a voltage wave having two voltage pulses of one polarity on either side of a pulse of the opposite polarity which occurs at a point of maximum matching of the two maps, and means responsive to the occurrence of the three pulses for producing outputs corresponding to the coordinates of the point at which a match of the maps occurred.

2. Apparatus for matching a pair of maps one of which is a positive transparency and the other is a negative transparency comprising means for superimposing said maps, a servo-system for shifting one of said maps in the Y-direction relative to the other, a second servo-system for shifting one of said maps in the X-direction relative to the other at the end of each excursion in the Y-direction, means for scanning the superimposed maps with a light spot moving in the Y-direction, means responsive to the light spot for producing a voltage wave having first and third pulse peaks of one polarity and an intervening pulse peak of the opposite polarity as the maps pass through a matched position, means responsive to the currents of the first and second pulses for storing the voltage corresponding to the Y-coordinate of the matched position, means responsive to the occurrence of the first, second and third pulses for storing the voltage corresponding to the X-coordinate of the matched position and means for producing output voltages corresponding to the stored voltages representing the X and Y coordinates.

3. Apparatus for matching a pair of maps comprising means for continually shifting said maps relative to each other, means for comparing said shifting maps and producing voltages representing the difference between said maps including a voltage wave having first and third peaks of one polarity and an intervening pulse peak of the opposite polarity as the maps pass through a first matched position, means responsive to a second voltage wave produced at a second position at which said maps are matched for producing one voltage output in response to an increase of the second voltage wave with respect to the first voltage wave and producing a second voltage output in response to a decrease of the second voltage wave with respect to the first voltage wave, and means responsive to said first and second voltage outputs for maintaining the voltages stored in response to said first voltage wave when the amplitudes of the first voltage wave peaks are greater than the voltage peaks of the second voltage wave and for erasing the voltages stored in response to the first voltage wave and storing voltages corresponding to the coordinates of the second matched position when the voltage peaks of the second voltage wave exceed the peaks of the first voltage wave.

4. A map matching system mounted in a vehicle for determining the location of the vehicle with respect to a selected area, said system comprising means for storing a map of said area, radiation sensitive means for producing a map of an area in the vicinity of said vehicle, means for scanning said stored map, means connected to said scanning means for producing voltages representative of said stored map, means for deriving voltages from said radiation produced map representative thereof, means for automatically hunting for the matching position of said maps, said last means including means for translating one of said representative voltages with respect to the other, electrical circuit means for comparing said two voltages, said electrical circuit means producing the difference between said two voltages, means including a high pass filter and a rectifier connected in series for deriving from said difference of said two voltages a relatively high voltage signal when only a slight mismatch between said maps occurs in any direction, and a relatively low voltage signal at the matching positions of said maps.

References Cited in the file of this patent
UNITED STATES PATENTS 2,679,636     Hillyer _____ May 25, 1954
2,712,898     Knutsen _____ July 12, 1955